United States Patent [19]
Todd et al.

[11] 3,751,642
[45] Aug. 7, 1973

[54] QUANTITY AND PRICE COMPUTER SYSTEM

[76] Inventors: David A. Todd; Barry Joseph Fitzgerald, both of P. O. Box 2546, Norman, Okla.

[22] Filed: Nov. 17, 1971

[21] Appl. No.: 199,686

[52] U.S. Cl................. 235/151.34, 73/229, 222/23
[51] Int. Cl............................ G06f 7/38, G01f 3/00
[58] Field of Search................. 235/151.34, 151.33; 340/347 AD, 347 P; 73/229, 209; 239/224; 222/23, 32

[56] References Cited
UNITED STATES PATENTS

| | | | |
|---|---|---|---|
| 3,199,727 | 8/1965 | Romanowski | 222/20 |
| 3,024,986 | 3/1962 | Strianese et al. | 340/347 X |
| 3,265,902 | 8/1966 | Wingate | 340/347 X |
| 3,612,393 | 10/1971 | Jones | 235/151.34 X |
| 3,566,087 | 2/1971 | Dilger | 235/151.34 X |
| 3,525,094 | 8/1970 | Leonard | 340/347 |
| 3,225,178 | 12/1965 | Giot et al. | 235/151.34 X |
| 2,949,539 | 8/1960 | Brown | 340/347 X |

*Primary Examiner*—Eugene G. Botz
*Assistant Examiner*—Edward J. Wise
*Attorney*—William S. Dorman

[57] ABSTRACT

An electronic computer system for use with any conventional material dispensing apparatus which utilizes a flowmeter having a rotating shaft output or pulse output. The computer system comprises pulse encoder means operably connected to the existing flowmeter, a programmable price computer with associated total price display unit, a total quantity display unit and a pulse shaper/divider for interfacing said encoder with the price computer and the quantity display unit.

7 Claims, 10 Drawing Figures

Patented Aug. 7, 1973

INVENTORS
DAVID A. TODD
BARRY FITZGERALD
BY William S. Dorman
ATTORNEY

Patented Aug. 7, 1973

INVENTORS
DAVID A. TODD
BARRY FITZGERALD
BY
William S. Dorman
ATTORNEY

Patented Aug. 7, 1973

INVENTORS
DAVID A. TODD
BARRY FITZGERALD
BY
William S. Dorman
ATTORNEY

INVENTORS
DAVID A. TODD
BARRY FITZGERALD
BY William S. Dorman
ATTORNEY

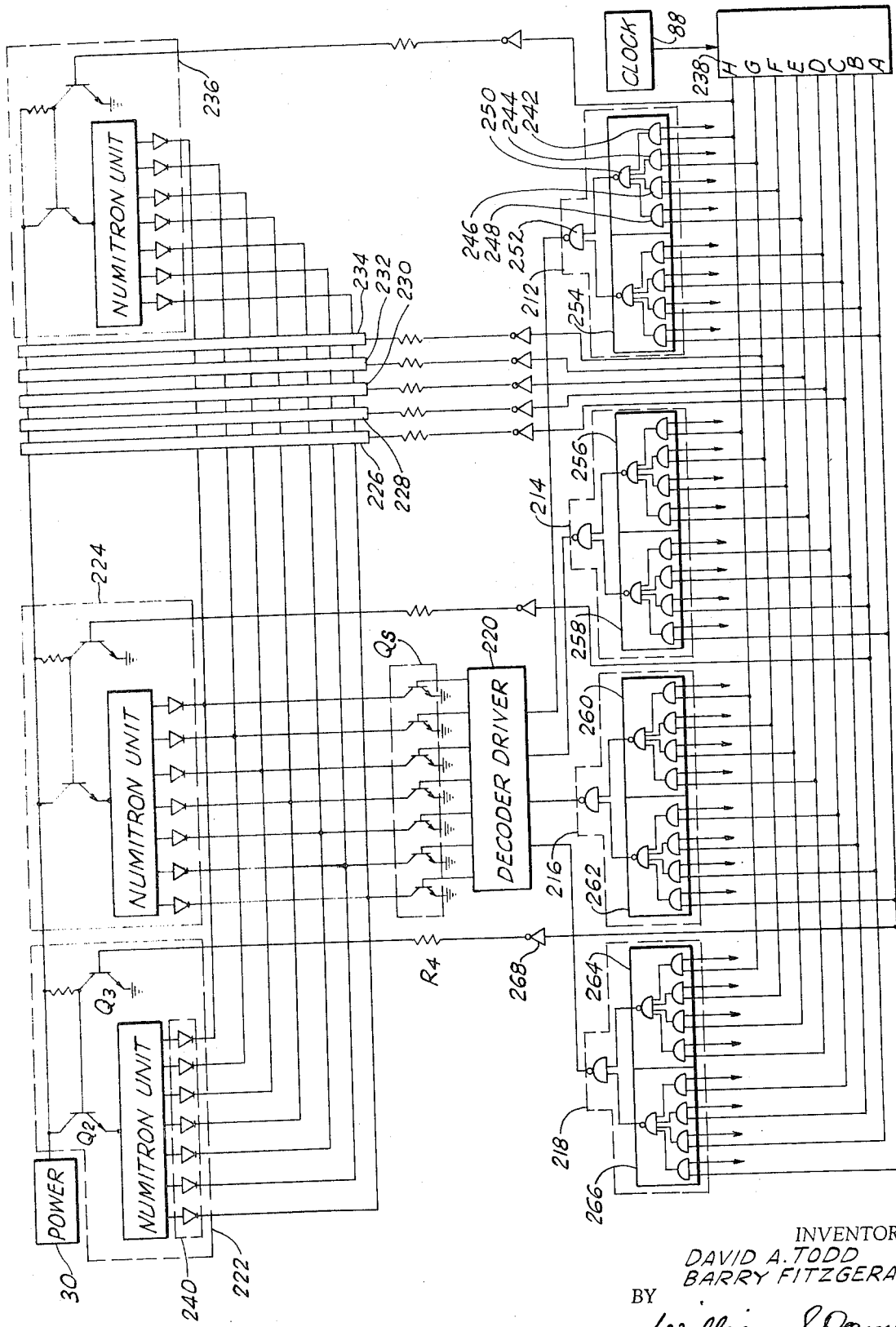

QUANTITY AND PRICE COMPUTER SYSTEM

FIELD OF THE INVENTION

This invention relates to improvements in electronic material dispensing computer systems and more particularly, but not by way of limitation, to an electronic computer system which utilizes electronic integrated circuits (IC's) to encode information from an ordinary flowmeter in a fluid or linear material dispensing system to compute and display total price and quantity of material as it is dispensed.

DESCRIPTION OF PRIOR ART

Computers used in conjunction with fluid dispensing pumps are normally either a combination electrical/mechanical apparatus which experiences early wear-out and maintenance problems, or in the form of electronic computers utilizing a system of vacuum tube recirculating ring counters such as the U.S. Pat. to Livesay, No. 3,081,031, issued in 1963. The Livesay patent discloses a system which operates directly on a pulse train from a flowmeter which requires the flowmeter to produce an extremely large number of pulses per unit volume in order to achieve reasonable accuracy and resolution. Other computers such as the U.S. Pat. to Wright No. 3,043,508 issued in 1962 are designed to operate only with special rotating vane pump type flowmeters, said computer being dependent on the flow rate remaining substantially constant during a short sampling interval. Other prior art patents utilize mechanical wheels and the like which are subject to excessive wear. Further, the vacuum tube ring counters as described hereinabove are also subject to short useful life periods and their use will result in excessive down-time for trouble-shooting and repair.

SUMMARY OF THE INVENTION

The present invention contemplates a novel electronic fluid dispensing computer system designed and constructed for overcoming the above disadvantages. The circuitry utilized in the present invention is entirely solid state thereby permitting the use of low operating voltage levels while maintaining extremely high reliability. The low voltage level of operation may also preclude the requirement of special explosion-proof housing or wiring. The present invention is also easily adapted to work with, but does not require, the speical rotating vane flowmeters having alternating current output. The present invention uses commercially available programmable decade counters connected as a triggered high speed pulse sequence generator whereby each pulse from the flowmeter representing a specific quantity of fluid generates a price count for that quantity of fluid thereby achieving acceptable accuracy and resolution without the necessity of the flowmeter producing a large number of pulses per unit volume nor the maintaining of a substantially constant flow rate for a sampling period. It is noted that the present invention may be used with any material dispensing system having a flowmeter with output relating to the volume measure of the material dispensed or the linear measure of the material dispensed. It is noted that the present invention may be used with industrial fluid transfer systems where the weight per unit transferred may be desirable rather than unit price transferred by setting in the density of the material to be transferred rather than price.

BRIEF DESCRIPTION OF THE DRAWINGS

FIG. 10 is a functional schematic diagram of a read-out multiplexer circuit to be used in conjunction with the price computer of FIG. 5 or the alternate price computer of FIG. 9.

DESCRIPTION OF THE PREFERRED EMBODIMENTS

Figure 3:
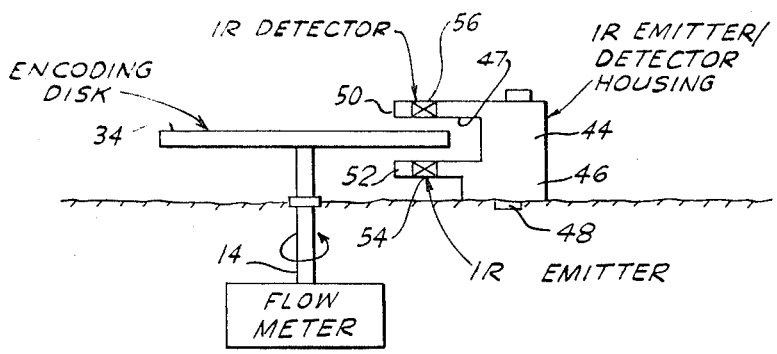
FIG. 3 is an elevational view of the encoding wheel and detection device for the encoding unit.

Referring to the drawings in detail, reference character 10 generally depicts a quantity and price computer system for a fluid dispensing apparatus to be used to replace mechanical or electro-mechanical calculators (not shown) in an ordinary gasoline pump dispensing machine (not shown), said gasoline pump dispensing machine having a flowmeter 12 which utilizes a rotating output shaft 14 (FIG. 3). It is pointed out that this invention can be used in conjunction with an electrical pulse output type flowmeter (not shown) with a slight modification as will be hereinafter set forth. The computer system 10 basically comprises a pulse encoder 16 operably connected to the output shaft 14 of the flowmeter 12 for producing an electrical pulse train having a pulse rate directly proportional to the flow rate of the fluid being dispensed. A pulse shaper/divider 18 is operably connected to the encoder 16 for squaring up the pulses in the pulse train and dividing said pulses to a rate compatible with the computing system. The output from the shaper/divider 18 is provided directly to a quantity counter/display unit 20 for counting the pulses, converting this pulse count to a decimal equivalent and displaying the total quantity of fluid being dispensed. The output from the shaper/divider circuit 18 is simultaneously provided to a price computer 22, said computer 22 having a plurality of price setting switches 24 for manually adjusting the price rate of the fluid to be dispensed. The price computer 22 serves to compute the price of each quantity of fluid being dispensed, said quantity being represented by each pulse received from the pulse shaper/divider circuit 18. A separate computation is made for each such pulse received. The price of each quantity of fluid represented by a single pulse from the circuit 18 is then provided to a price counter/display unit 26 in the form of a pulse train as will be hereinafter set forth. The price counter/display unit 26 then counts the pulses from the price computer 22 converting the pulses to a decimal equivalent and displaying the total price of fluid being dispensed. The reset switch 28 is operably connected to the quantity counter/display unit 20, the price computer 22, and the price counter/display unit 26 for zeroing said units in preparation for another delivery of the fluid. A light test switch 27 is operably connected to the quantity counter/display unit 26 and price counter/display unit for testing the display tubes.

A regulated power supply 30 for supplying direct current (DC) power to all of the units comprising the system 10 is provided. The power supply 30 is connected to any common alternating current (AC) line 32 with voltage preferably ranging from 110 to 125 volts with frequency between 50 and 60 Hertz. The unit may be connected with the line voltage by means of a suitable ordinary plug member (not shown). The power supply 30 is a standard regulated supply comprising generally an on-off switch 166, a step-down transformer T1, the output of the transformer T1 being operably connected to a full-wave rectifier 168. The rectified output from the rectifier 168 is then filtered and regulated by the load regulation circuit as generally indicated by reference character 170. The power supply has two suitable positive DC outputs 172 and 174 and a Silicon Controlled Rectifier (SCR) triggered over-voltage circuit 176 to protect the IC's in case of regulation failure.

Figure 4:
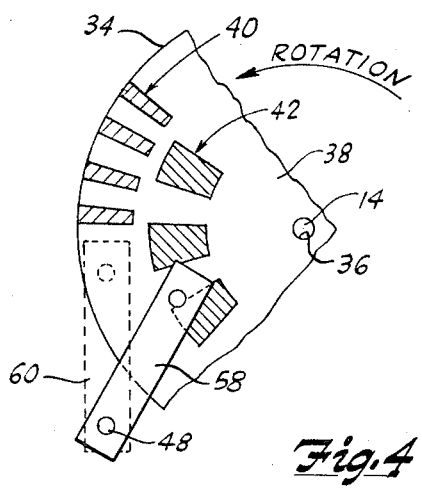
FIG. 4 is a vertical or top view of a portion of the encoding wheel and the detecting device for the encoding unit.

The pulse encoder 16 generally comprises an optical encoder wheel 34 which is attached at the center point 36 thereof to the rotating output shaft 14 of the flowmeter 12. The encoder wheel 34 comprises a thin circular disc 38 constructed from a translucent material such as clear plastic or the like having a first plurality of spaced opaque longitudinal strips 40 radially secured to the disc 38 around the outer portion of said disc. Each of said strips are equally spaced from the other for a purpose as will be hereinafter set forth. A second plurality of spaced opaque longitudinal strips 42 are radially secured on the disc 38 radially inward from the first set of strips 40 for a purpose as will be hereinafter set forth. The width of the strips 40 and of the strips 42 in relation to the diameter of the disc 38 should be such that the open space between each two strips in somewhat wider than each of said strips. The pulse encoder 16 also comprises an infra red (IR) emitter/detector unit 44 which is contained in an elongated housing 46. The housing 46 is rotatably secured at one end thereof to the fluid dispensing apparatus (not shown) at a point adjacent to the outer edge of the disc 38 such that said housing 46 can be pivoted about a point 48, the rotation thereof being in the same plane as that of the rotating disc 38. The opposite end of the housing 46 is provided with a transverse horizontal groove or channel 47 thereby forming a first arm 50 and a second parallel arm 52. The housing 46 may be rotated about the point 48 such that the arms 50 and 52 may be positioned on either side of the disc 38, the outer edge of said disc 38 being allowed to freely rotate within the channel 47 (FIGS. 3 and 4).

An IR emitter 54, which may consist of a light emitting diode such as the commercially available Monsanto ME4, ME60, or Optron OP100, is secured to the second mentioned arm 52 with the IR emission therefrom being directed toward the opposite arm 50. An IR detector 56 which may consist of a photosensitive transistor such as the commercially available Optron OP300 or a Fairchild FPT100, is secured to the first mentioned arm 50 with the photosensitive element being positioned to receive the IR radiation emitted from the IR emitter 54. Therefore, it is readily seen that when the IR emitter 54 and detector 56 are positioned on either side of the rotating disc 38, in a first position 58 as shown in FIG. 4, and as the disc 38 rotates, the IR emission from the emitter 54 is interrupted by each strip of the plurality of strips 42 and likewise when the emitter 54 and detector 56 are positioned on either side of the outer portion of the disc 38, the said IR emission is interrupted by each of the opaque strips 40 when the disc 38 is rotated.

Figure 1:
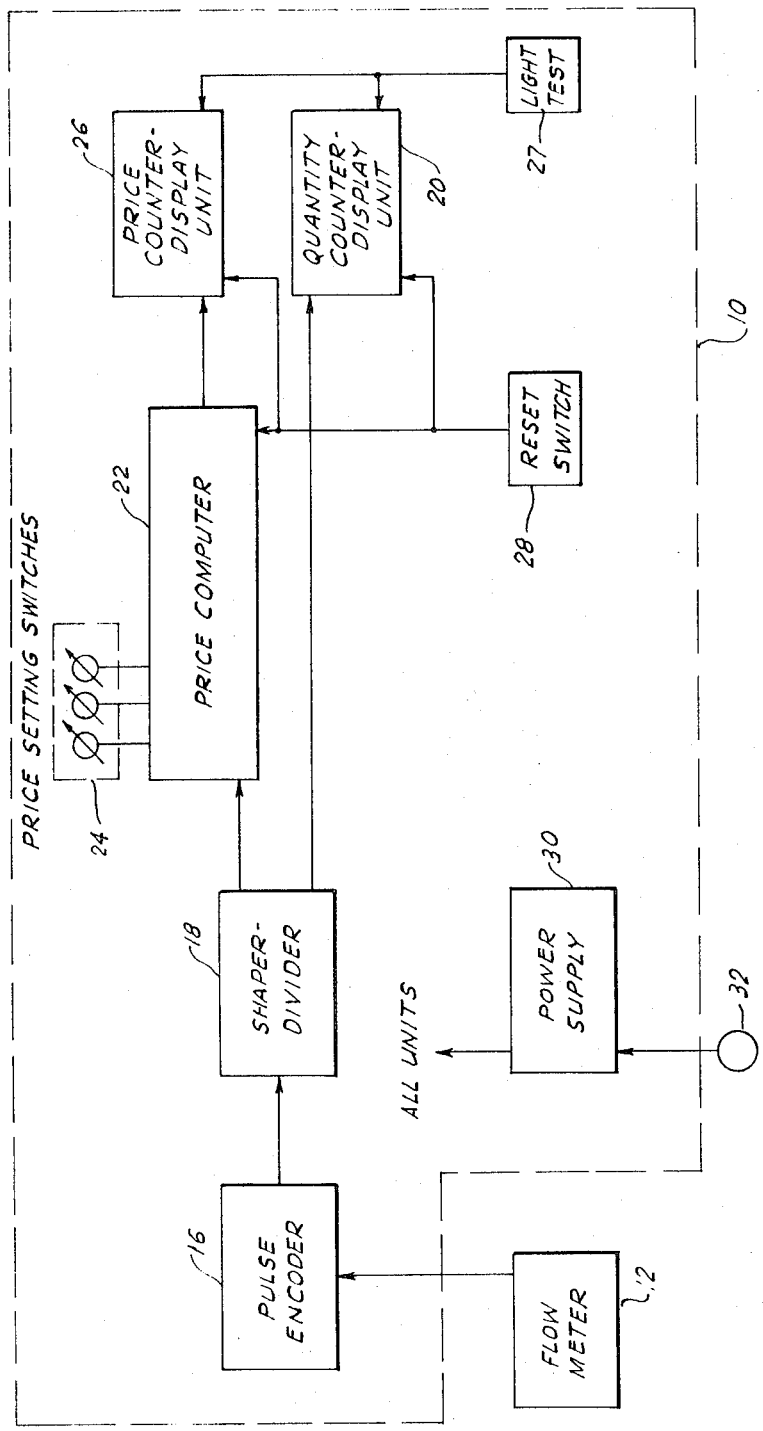
FIG. 1 is a schematic block diagram depicting the general operating function of a fluid dispensing computer system embodying the invention.
Figure 2:
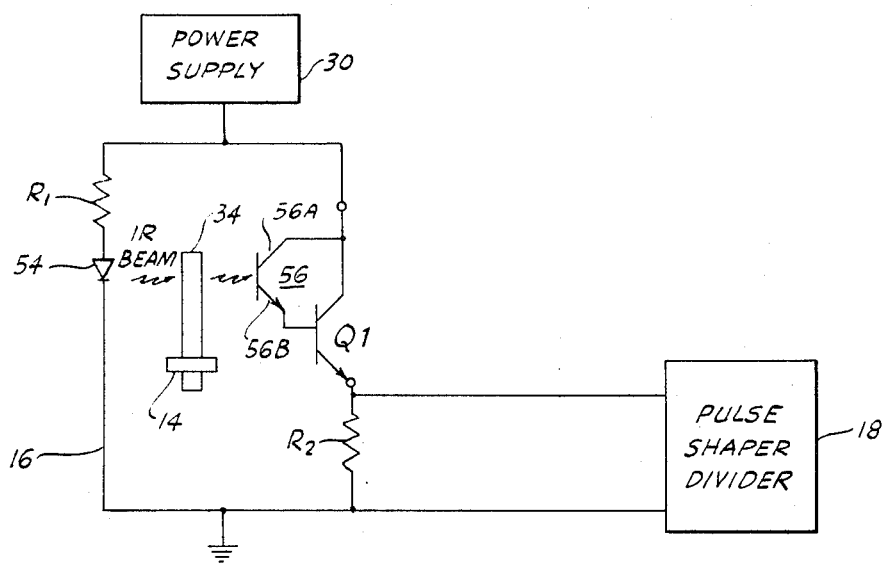
FIG. 2 is a combination electrical/mechanical schematic depicting the general operation of the encoding unit.

Referring to FIG. 2, the IR emitter 54 is provided with power from the power supply 30 through a load resistor R1, thereby causing said emitter 54 to emit a continuous beam of IR radiation directed toward the dector 56. The detector 56, being a photosensitive transistor, has a collector 56A connected to the power supply 30 and an emitter 56B operably connected to the base of a second switching transistor Q1, said collector 56B serving to bias the transistor Q1 "off" when the IR radiation from the emitter 54 is interrupted by the opaque strips 40 and 42 and to bias the transistor Q1 "on" when the IR radiation is being received by the detector 56 thereby providing a series of voltage pulses across the load resistor R2 as the wheel 34 is rotated. This series of pulses created across the resistor R2 is provided as an input to the pulse shaper/divider circuit 18. It is readily seen that since the rate of rotation of the shaft 14 is proportional to the rate at which the fluid is being dispensed and since the opaque strips 40 and 42 are equally spaced on the disc 38 for interrupting the IR radiation from the emitter 54, the pulse train produced across the resistor R2 will be directly proportional to the rate of fluid being dispensed.

The flowmeter 12 of a standard gasoline dispensing pump (not shown) normally has an output shaft 14 rotation of 4 revolutions per gallon of gasoline delivered. The encoding is accomplished as hereinbefore set forth by means of the optical pulse encoder 16. In this application, the plurality of opaque strips 42 consists of 50 such strips of equal width and being equally spaced at approximately 7.2° apart thereby resulting in a wave form corresponding to 200 pulses per gallon of gasoline delivered. The outer plurality of opaque strips 50 may consist of 189 such strips of equal width and being equally spaced at approximately 1.905° intervals, thereby resulting in a wave form corresponding to approximately 200 pulses per liter of gasoline delivered. Therefore, by simply rotating the IR emitter/detector housing from the position 59 (FIG. 4) to a second position 60 such that that the IR emission is interrupted by each strip of the plurality of opaque strips 40, the standard gasoline pump (not shown) is converted from the U.S. gallon system to the metric system (liters) utilizing the standard existing flowmeter 12. The pulse shaper/divider circuit 18 comprises two NAND gates 62 and 64 connected as a Schmitt trigger circuit 66 (FIG. 5) to provide a regular wave form corresponding to the pulses receive from the optical pulse encoder 16 and to reduce the possibility of false triggering from noise in the system. The Schmitt trigger circuit 66 also comprises a feed back loop from the output of the NAND gate 64 through a load resistor R3 to one input of the NAND gate 62. An input diode D1 is provided at one input of the NAND gate 62 to allow only positive going pulses to pass into that input of the NAND gate 62. The Schmitt trigger circuit 66 serves to shape the pulse wave form from the optical pulse encoder 16 into fast-rising and fast-falling voltage level shifts. Since when the gasoline is being dispensed at a very low rate, the pulse wave form from the optical pulse encoder 16 may not have "fast-rising" and "fast-falling" times due to the slow rotation of the optical disc 38, the trigger circuit 66 will prevent false triggering by triggering only when a predetermined voltage level is reached. This predetermined triggering voltage level is determined by the value of the feed back load resistor R3 and the diode D1 in the Schmitt triggering circuit 66. The shaped pulse train out of the Schmitt trigger circuit 66 is then divided by two to obtain 100 pulses per unit (ppu) of fluid measure dispensed for compatibility with the programmable price computer 22. This frequency division is performed by a dual D flip-flop 68 connected as a toggle flip-flop wherein only one of the two outputs is connected to the downstream circuitry. Therefore, the first pulse received by the flip-flop 68 from the Schmitt trigger circuit 66 positions the flip-flop 68 in a first state providing, for example a high (logic "1") voltage output to the downstream circutry. The receipt of the second pulse from the trigger circuit 66 changes the state of the flip-flop 68 to a second state wherein the output to the downstream circuitry is low (logic "0"). Thus, the output of flip-flop 68 is a pulse train with a frequency (repetition rate) of one-half of the input pulse train. The connected output from the flip-flop 68 is provided directly to the input of the price computer 22 and also the quantity counter/display unit 20 through a pulse inverter (IC) 141.

The price computer 22 comprises three programmable decade counters 70, 72 and 74 (FIG. 5) connected in sequence, counter 70 for the "tenths" ($10^{-1}$), counter 72 for the "units" ($10^0$), and counter 74 for the "tens" ($10^1$). The price computer 22 also comprises three ten-position wafer type decimal switches 76, 78 and 80, and three associated binary code decimal (BCD) diode encoders 82, 84 and 86, respectively, for programming the price per unit volume of gasoline to be dispensed. The diode encoders 82, 84 and 86 have the function of converting the price per unit volume setting of the decimal switches 24 to a binary coded decimal form for presetting the programmable decade counters 70, 72 and 74 to the 9's additive complement of the price. For example, as the price setting switches 24 are set as follows: switch 76 set at three, switch 78 set at four, and switch 80 set at 9, representing 34.9 cents per unit volume, the diode encoders 82, 84 and 86 will program the counters 70, 72 and 74 at "6", "5" and "0", respectively (999−349=650) in a manner that will be hereinafter set forth.

The price counter 22 also comprises an astable multivibrator clock 88 for generating high speed clock pulses, an input control flip-flop 90, a three input NAND gate 92, and a multiple input NAND gate 94. The inputs for the three-input NAND gate 92 are operably connected to (1) the output of the clock 88, (2) the output of the control flip-flop 90 (100 ppu pulse train), and (3) the output of the NAND gate 94. The NAND gate 94 receives its inputs from the output terminals of the counters 70, 72 and 74. When the said counters are full (999) and only when they are full, each of the eight inputs are at logic (1), providing a "zero" input to the NAND gate 92 thereby disabling the gate 92. The control flip-flop 90 is a clocked flip-flop which is operable only when the clock pulses are provided from the multivibrator clock 88. Said flip-flop 90, upon receipt of the leading edge of a pulse (representing 1/100th of a unit measure) from the flip-flop 68, goes to the "high" (logic "1") and produces an output which enables the NAND gate 92. At the end of the pulse from the flip-flop 68 the control flip-flop 90 goes to the "low" state (logic "0") thereby disabling the NAND gate 92 and providing a signal to stroke each of the counters 70, 72 and 74 to their preset count so that the computer is ready for the next subsequent pulse from the flip-flop 68. The clock 88 is an astable multivibrator comprising staged invertors 89, 91, 93 and 95 having feedback and RC timing circuits 97 and 99, respectively. For this application the clock 88 is designed to operate at a frequency of approximately 2 megaHertz. It is noted that the clock frequency may be changed by a simple substitution of components. The price computer 22 also comprises three decade counters 96, 98 and 100 which are serially connected for dividing the pulse signal by the proper number to obtain the correct decimal price display. Decade counter 100 is programmed to reset to a binary coded decimal 5 which corresponds to $00.005 in order to present the displayed total price rounded off to the nearest cent. For example, a total computed price of $4.375 is displayed as $4.38 while a price of $4.374 is displayed as $4.37. The signal from the counter 100 is provided as an input to the price counter/display unit 26.

The price counter/display unit 26 comprises four (4) serially connected decade counters 102, 104, 106 and 108, the output from the counter 100 of the price computer 22 being provided as an input to the counter 102, each decade counter 102, 104, 106 and 108 having an associated decoder/driver 110, 112, 114 and 116, respectively. Each of said decoder/dirvers 110, 112, 114 and 116 is used to drive a pair of parallel connected seven-segment incandescent filament digital display tubes 118 and 120, 122 and 124, 126 and 128, and 130 and 132, respectively. The paralleling of the said display tubes is necessary for a read-out visible from both sides of the physical unit as presently required for retail gasoline dispensing pumps. Where only one display is required, tubes 118, 122, 126 and 130 may be eliminated.

Figure 5:
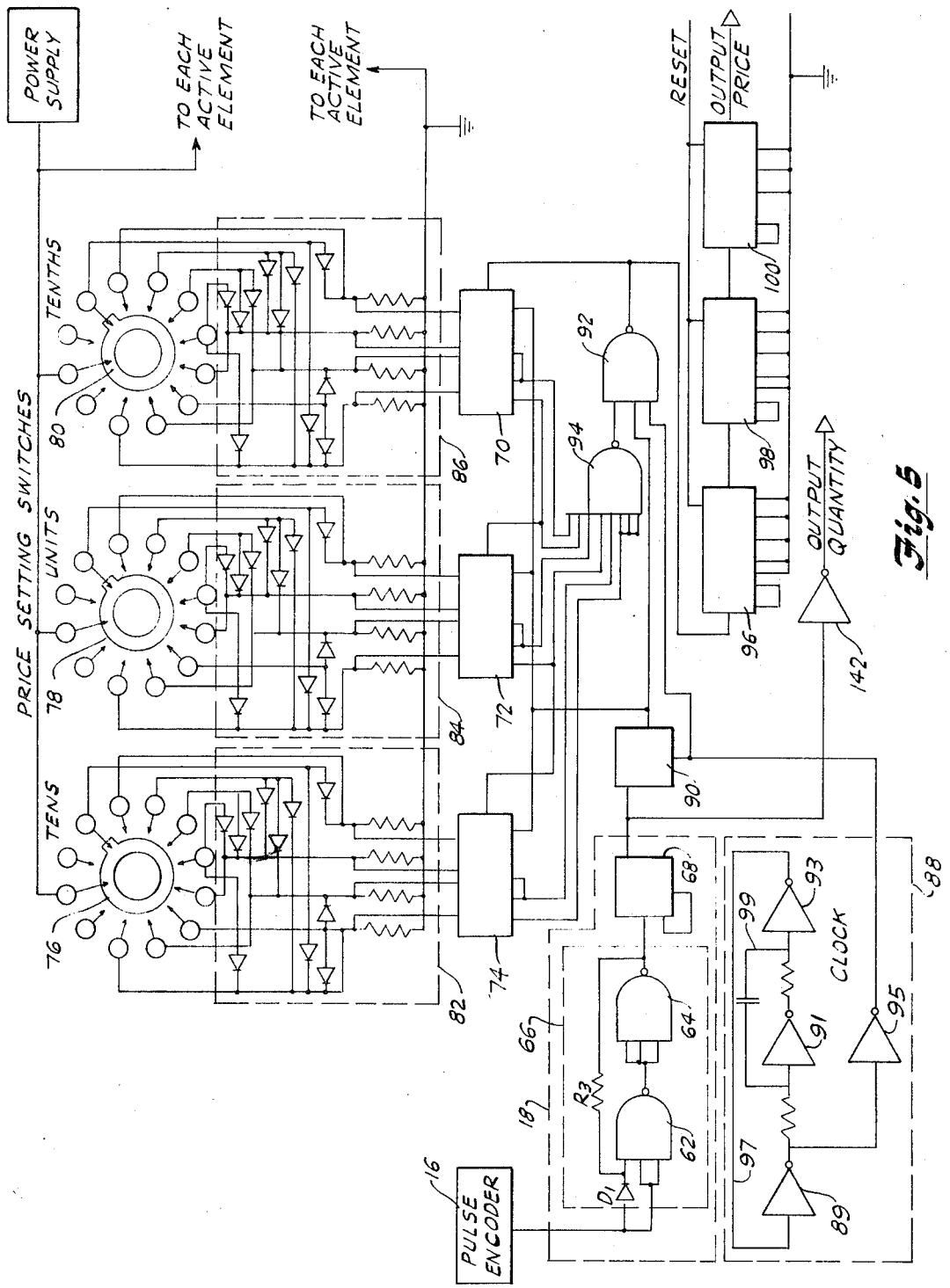
FIG. 5 is a schematic diagram depicting the circuitry for the price computer.

The quantity counter/display unit 20 is substantially identical to the price counter/display unit 26 and comprises four serially connected decade counters 134, 136, 138, and 140. The output from the divider flip-flop 68 of the shaper/divider circuit 18 is provided through an inverter (IC) 141 (FIG. 5). The output from the IC 141 is provided as an input to the decade counter 134 (FIG. 7) of the quantity counter/display unit 20. Each decade counter 134, 136, 138 and 140 has an associated decoder/driver 142, 144, 146 and 148, respectively. Each said decoder/driver used to drive a pair of parallel connected seven-segment incandescent filament digital display tubes 150 and 152, 154 and 156, 158 and 160, and 162 and 164, respectively. The paralleling of said display tubes is necessary to provide a read-out from both sides of the physical unit as set forth in the description of the price counter/display unit 26 hereinabove.

In operation, the quantity and price computer system 10 is mounted in a suitable housing (not shown) which is comparable in size to the electro-mechanical computing and displaying apparatus (not shown) presently used in existing gasoline pump dispensing units (not shown) and is then substituted therefor. The optical encoder wheel 34 is then attached to the rotating output shaft 14 of the existing flowmeter 12. The IR emitter/detector housing 46 is then rotatably secured to the pumping machine (not shown) or the computer housing adjacent to the encoder wheel 34 in the manner hereinbefore set forth. The housing 46 is then rotated to the position 58 (FIG. 4) and the power supply 30 is connected to external line power.

As set forth hereinabove, as fluid is being dispensed, the output shaft 14 of the flowmeter 12 will cause the encoder wheel 34 to rotate at a rate directly proportional to the rate of flow of fluid being dispensed, (in this application, 4 revolutions per gallon of fluid dispensed). The optical pulse encoder 16 then produces an output pulse train of 200 pulses per gallon as a result of the plurality of opaque strips 42 which are interposed between the IR emitter 52 and the detector 50. The output pulse train from the optical pulse encoder 16 is then provided to the pulse shaper/divider circuit 18 wherein the pulses are squared up and divided by two to obtain the 100 pulses per unit of fluid dispensed required by the programmable price computer 22 as hereinbefore set forth. This 100 ppu of fluid dispensed is routed through the pulse shaper inverter (IC) 141 and to the quantity counter/display unit 20 where said pulse train is serially entered into the four stage decade counter comprising counters 134, 136, 138 and 140. The digital conversion of the input pulse train contained in the quantity counter/display unit 20 is then decoded by the decoder/drivers 142, 144, 146 and 148 which in turn display the total quantity of fluid delivered on the associated display tubes 150, 152, 154, 156, 158, 160, 162 and 164. The 100 ppu output from the pulse shaper/divider circuit 18 is also provided to the control flip-flop 90 of the price computer 22. As hereinbefore set forth, the price setting switches 24 are set to the desired unit price, for example, 34.9 cents per gallon. The diode encoders 82, 84 and 86 then automatically program the three-stage counters comprising counters 70, 72 and 74 to the 9's additive complement of the price, i.e., 650, as hereinbefore set forth. Upon receipt of the leading edge of the first pulse from the shaper/divider circuit 18, the control flip-flop 90 produces a high (logic 1) output which enables the three-input NAND gate 92 thereby allowing the high speed pulses from the clock 88 to be fed serially into the programmed three-stage counters 70, 72 and 74 and also to the divide down counters comprising counters 96, 98 and 100, and thus, through said divide down counters to the price counter/display unit 26, The clock pulses then proceed to fill up the programmed counter from the preset value of 650 to a value of 999 at which time the multiple input NAND gate 94 is disabled thereby disabling the NAND gate 92 shutting off the clock pulses which are being fed to the divide down counters and to the price counter/display unit 26. At the end of the first pulse input from the shaper/divider circuit 18, the control flip-flop 90 produces a low (logic 0) output and the programmable counters 70, 72 and 74 are reset to the original count (650) determined by the setting of the price switches 24. Thus, one pulse from the encoder circuitry which represents 1/100ths of a gallon, has generated 349 pulses (999–650) which have been counted and displayed. The process then repeats for each pulse from the optical encoder 16, serially shifting the price computed for each 100th of 1 gallon of fuel dispensed into the price counter/display unit 26 to be displayed by the display tubes thereof. It is noted that the clock frequency need only be high enough to allow up to 999 pulses from the clock to shift into the programmable counters during one input pulse from the flip-flop 68. It is readily apparent that the frequency of the input pulses is set by the maximum pumping speed of the pump. However, a 2 megaHertz clock is adequate to operate with available retail pumping units now in use. If necessary to use the computer system 10 with pumps having higher pumping speeds, the clock frequency may be increased, for instance to 10 megaHertz, with a simple change of component parts.

The three divide down decade counters comprising counters 96, 98 and 100 are necessary to obtain the proper decimal point display. The price display is rounded off to the nearest cent as set forth hereinabove by programming the decade counter 100 to a BCD coded decimal 5.

ALTERNATE PRICE COMPUTER

Figure 9:
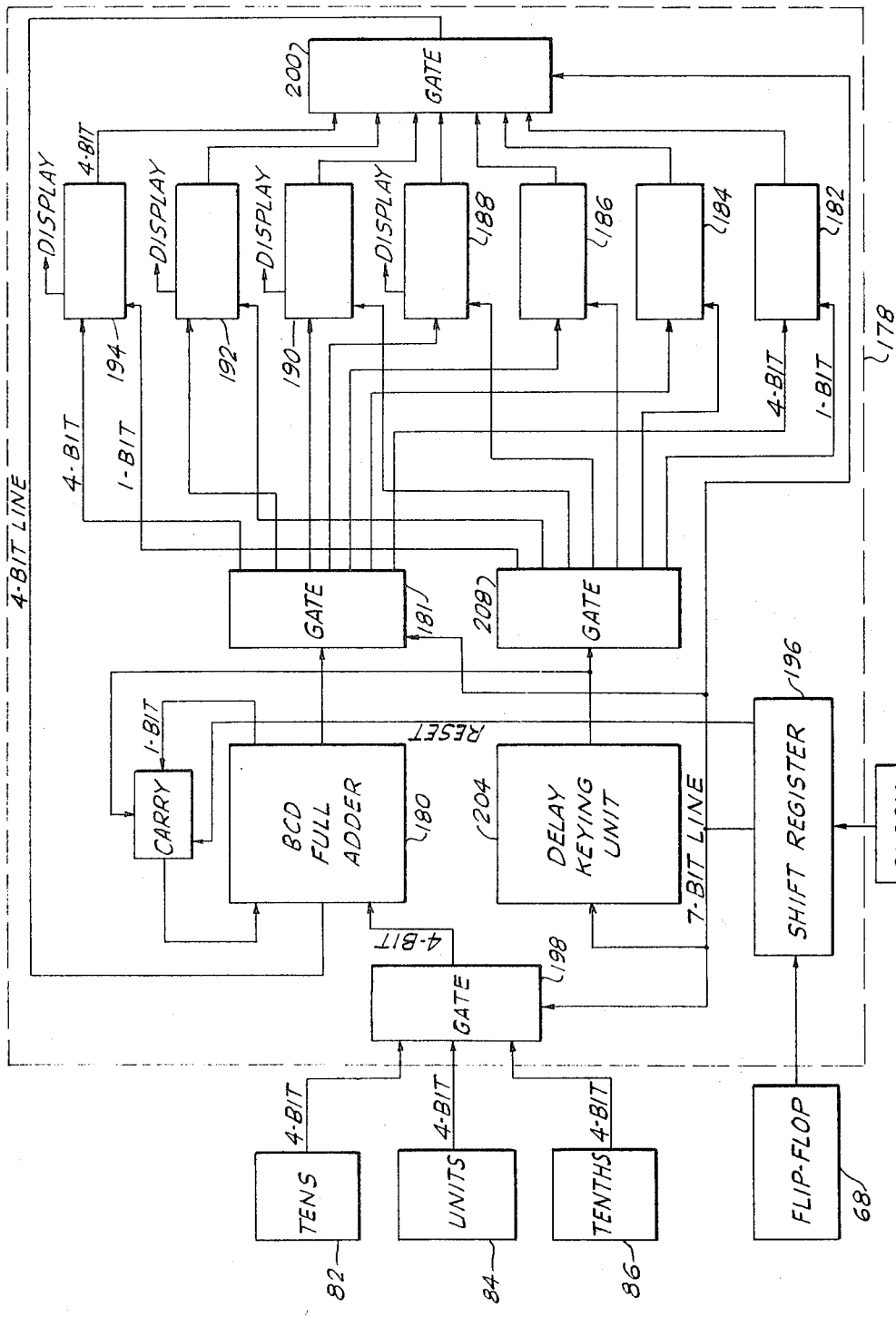
FIG. 9 is a functional schematic diagram of an alternate price computer.

Referring now to FIG. 9, reference character 178 generally indicates an alternate computer which may be used in place of the price computer 22 hereinbefore described. The alternate price computer 178 is basically a high speed adder that successively adds the amount encoded in the price setting switches 24 to each previous total as the fluid is being dispensed. The computer 178 comprises a BCD full adder 180, the output of which is multiplexed by a directional gate 181 (one of seven selector) to add one digit at a time in each of the seven digital storage elements 182, 184, 186, 188, 190, 192 and 194. This addition process is timed so that during a single pulse from the divide by two flip-flop 68, representing 1/100th of a unit of fluid delivered, the computer 178 will cycle through all seven digits.

The computer 178 also comprises an 8-bit shift register 196 which is operably connected to the output of the flip-flop 68 and the clock 88. The price encoders 82, 84 and 86 are each operably connected by means of a 4 bit line to a directional gate circuit 198 (a one-of-three selector), the otuput of said gate 198 being connected also by a four bit line as an input to the adder 180. The output of each of the seven storage elements are operably connected by a 4 bit line to a third directional gate 200 (a one-of-seven selector), the output of said gate 200 being connected by a four bit line to the input of the adder 180. The adder 180 is provided with a carry storage element 202 for storing an excess bit for the next addition in case the sum exceeds the four bit capacity. The output of the shift register 196 is operably connected by a 7 bit line to the gates 181, 198 and 200 for a purpose as will be hereinafter set forth. The output from the 8th bit of the shift register 196 is operably connected to the carry storage element 202 for a purpose as will be hereinafter set forth.

The output from the shift register 196 is also operably connected by a 7 bit line to a delay keying circuit 204, the output of said keying circuit 204 being operably connected to a fourth directional gate 208 and to the carry storage element 202, for a purpose that will be hereinafter set forth. The seven enabling outputs of the gate 208 are connected, one to each of the storage elements 182, 184, 186, 188, 190, 192 and 194. Likewise, the 4 bit outputs of the gate 181 are connected as inputs to each of the storage elements. The output of the clock 88 is provided to the shift register 196 for effecting the shift-in of the pulse from the flip-flop 68.

The delay keying circuit 204 serves to first delay the pulse received from the shift register 196, the leading edge of said pulse then serving to trigger a monostable multivibrator which in turn provides an extremely short output pulse. This extremely short pulse is then gated by the gate 208 to the proper storage element where it is utilized to open said storage element so that information from the adder 180 may be entered into said storage element.

In operation, the alternate price computer 178 may be utilized to substantially replace the price computer 22 hereinbefore described. It is noted, however, that the diode encoders 82, 84 and 86 of the price computer 22 or their equivalent is required to input price information into the alternate price computer 178. The computer 178 may be used in conjunction with the price counter/display unit 26 by eliminating the counters 102, 104, 106 and 108 therefrom and operably connecting the storage elements 188, 190, 192 and 194 directly to the decoder drivers 110, 112, 114 and 116, respectively.

At the start of the delivery of fluid all storage elements are at "0" except storage element 186 which is preset at BCD code 5 to achieve proper rounding off as hereinbefore set forth. Upon receipt of a pulse form the flip-flop 68 (representing 1/100th gallon of fluid delivered), the shift register 196 starts to shift said pulse into the shift register. Upon the first pulse from the clock 88, the shift register output then strobes gate 198 allowing the price setting in the encoder 86 (10ths) to be passed through the gate 198 and into the adder 180. The gate 200 is simultaneously strobed to allow the information stored in element 182 (in this case "0"), to be passed through the gate 200 and into the adder 180. The information in the carry storage element 202 (in this case "0") is also inputted into the adder 180 and all three inputs are added and the sum thereof passed through the gate 181 and to the input of the storage element 182. At the time that gates 198 and 200 were strobed by the output of the shift register 196, a like output was made available to the delay keying circuit 204 where said pulse was delayed and then caused to trigger the monostable miltivibrator which in turn produced an extremely short output pulse which was gated by the gate 208 to the storage element 182, thereby enabling the storage element 182 to accept the sum information from the adder 180. This sum is entered into the element 182, said element being quickly disabled due to the extremely short duration of the enabling pulse from the circuit 204. Likewise, as the sum of the input to the adder 180 exceeds the 4 bit capacity thereof, there will be a 5th bit carry which will be provided to the input of the carry storage element 202 and will be entered into said element 202 when an enabling pulse is received from the output of the delay keying circuit 204. It is noted that the duration of the enabling pulse from the circuit 204 must be shorter than the propagation time for that same information to go back through the adder 180.

When the pulse from the flip-flop 68 is shifted into the second position of the shift register 196, the information in the storage element 184, the price encoder 84 (units) and the carry storage element 202 is inputted into the adder 180 and the sum from said adder 180 is provided to the input of the storage element 184 and the carry, if any, is provided to the carry storage element 202 in the same manner as hereinbefore set The The above described process is repeated for the next register 196 shift thereby adding the information stored in the storage element 86, price encoder 82 (tens) and the carry storage element 202. This sum is then entered into the storage element 186. Each subsequent shift of the shift register 196 will cause the information stored in each respective storage element 188, 190 and 192 to be added to the information in the carry storage until the eighth shift of the registr 196. On the eighth shift of the register 196, a reset signal is provided by the shift register 196 to zero the carry storage element 202. It is also noted that the information in the storage elements 188, 190, 192 and 194 are provided by 4 bit lines to the decoder drivers 110, 112, 114 and 116, respectively, for displaying the total price of fluid delivered.

ALTERNATE READ-OUT MULTIPLEXER

Referring now to FIG. 10, reference character 210 generally indicates an alternate read-out miltiplexer which may be used to replace a substantial portion of the price counter/display unit 26 and the quantity counter/display unit 20 hereinbefore described. The read-out multiplixer 210 may be used in conjunction with the price computer 22 or with the alternate price computer 178. The read-out multiplexer 210 comprises four gate packs 212, 214, 216 and 218 for gating the digital BCD information from the quantity counters 134, 136, 138 and 140 and the digit BCD information from the price counters 102, 104, 106 and 108 (or the storage elements 188, 190, 192 and 194 of the alternate price computer 178) successively through a seven segment decoder driver 220, one digit at a time and recycling as will be hereinafter set forth. The outputs of the seven segment decoder driver 220 are operably connected in parallel to eight pairs of seven segment numitrons 222, 224, 226, 228, 230, 232, 234 and 236 for display. The numitron pairs 222, 224, 226 and 228 are for displaying total price information while numitrons 230, 232, 234 and 236 are for displaying total quantity information.

The read-out multiplexer 210 also comprises an eight-stage solid state recirculating ring counter 238 which is recirculated by impulses from the clock 88. The eight outputs of the ring counter 238 are operably connected in parallel to the inputs of substantially identical gate packs 212, 214, 216 and 218 for successively enabling the digital BCD information from the price computer 22 (or 178) and the quantity counters 134, 136, 138 and 140 to be passed through the said gate packs to the decoder drivers 220. The eight outputs of the ring counter 238 are also operably connected, one to each of the eight numitrons so that only the numitron corresponding to the digit being gated is turned on. Each numitron is provided with a pair of switching NPN transistors, such as Q2 and Q3 for numitron 222, which are triggered by a pulse from the ring counter 238. Said pulse is passed through an inverter such as the inverter 268 and across a load resistor such as R3 to the base of the transistor Q3. Upon receipt of the pulse from the ring counter 238 the current from the power supply 30 is allowed to flow only to the proper numitron digit.

The output of each pair of numitrons is provided with seven diodes, such as the diodes 240 for the numitron 222 on each side, or 14 total to isolate the inactive unmitrons. Further, since the seven segment decoder driver 220 may be of a low power capacity, it is used simply to trigger a set of seven power sink switching transistors QS to provide enough current to perform the display functions.

Figure 6:
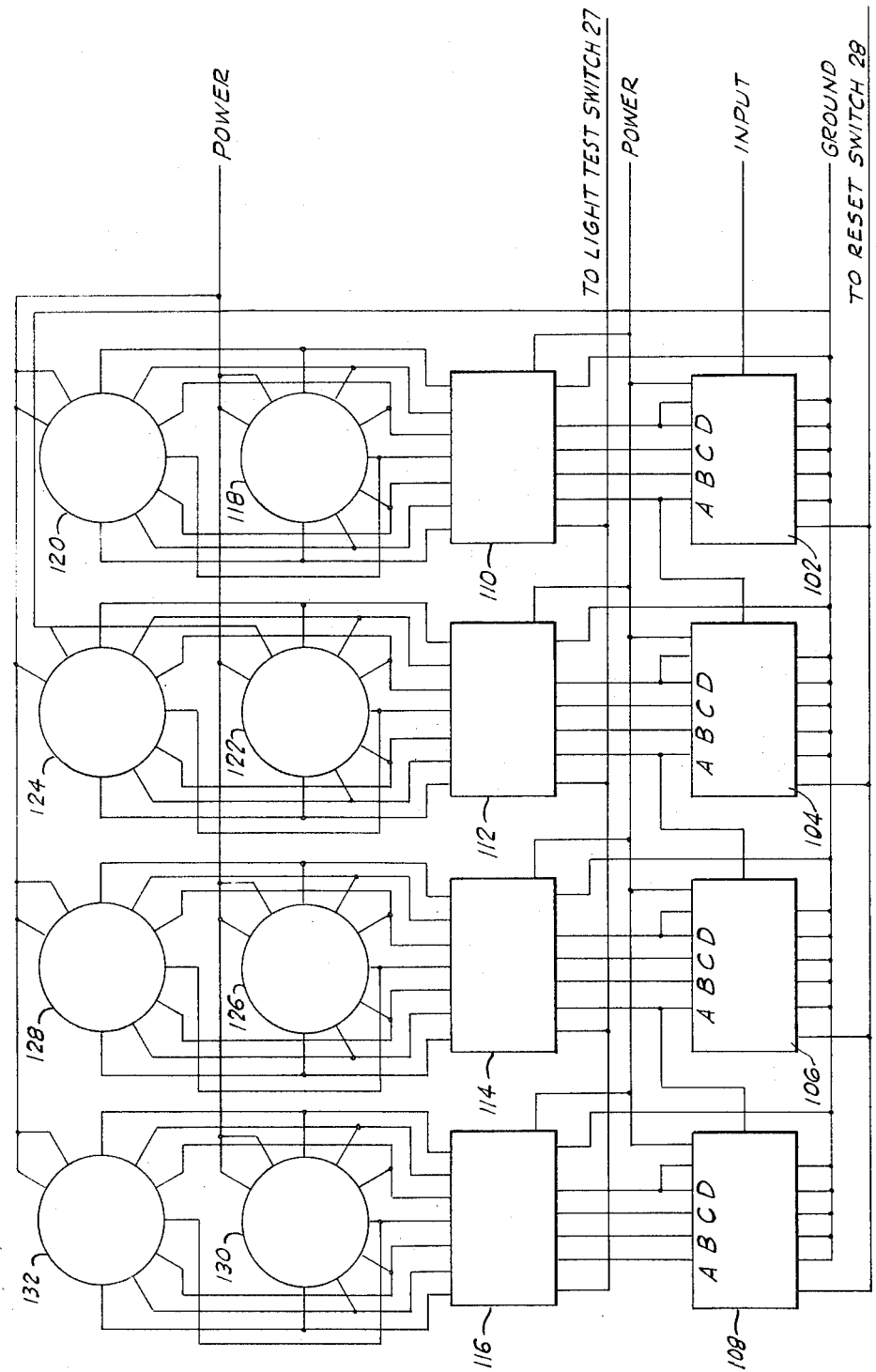
FIG. 6 is a schematic diagram depicting the circuitry for the price counter/display unit.
Figure 7:
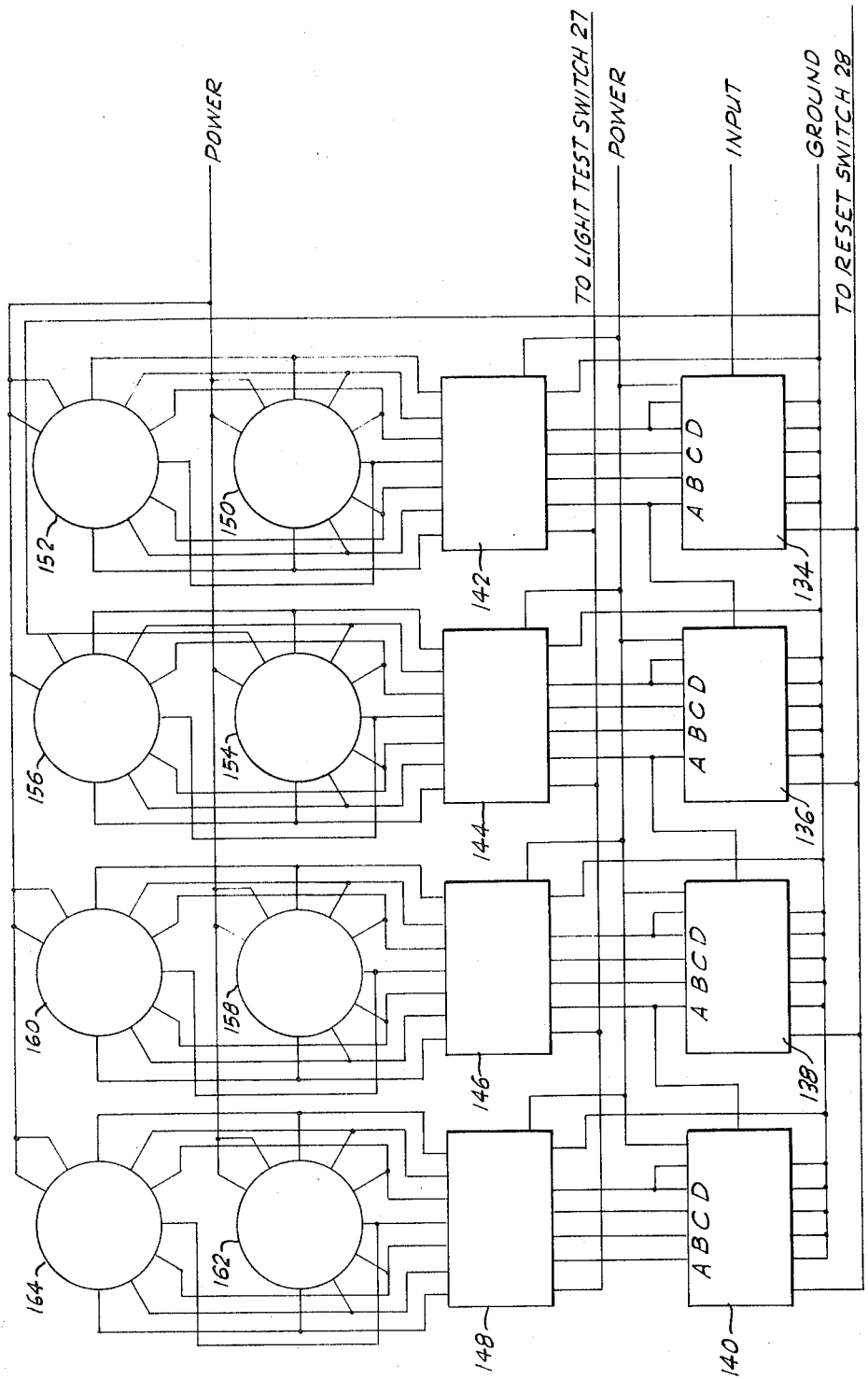
FIG. 7 is a schematic diagram depicting the circuitry for the quantity counter/display unit.
Figure 8:
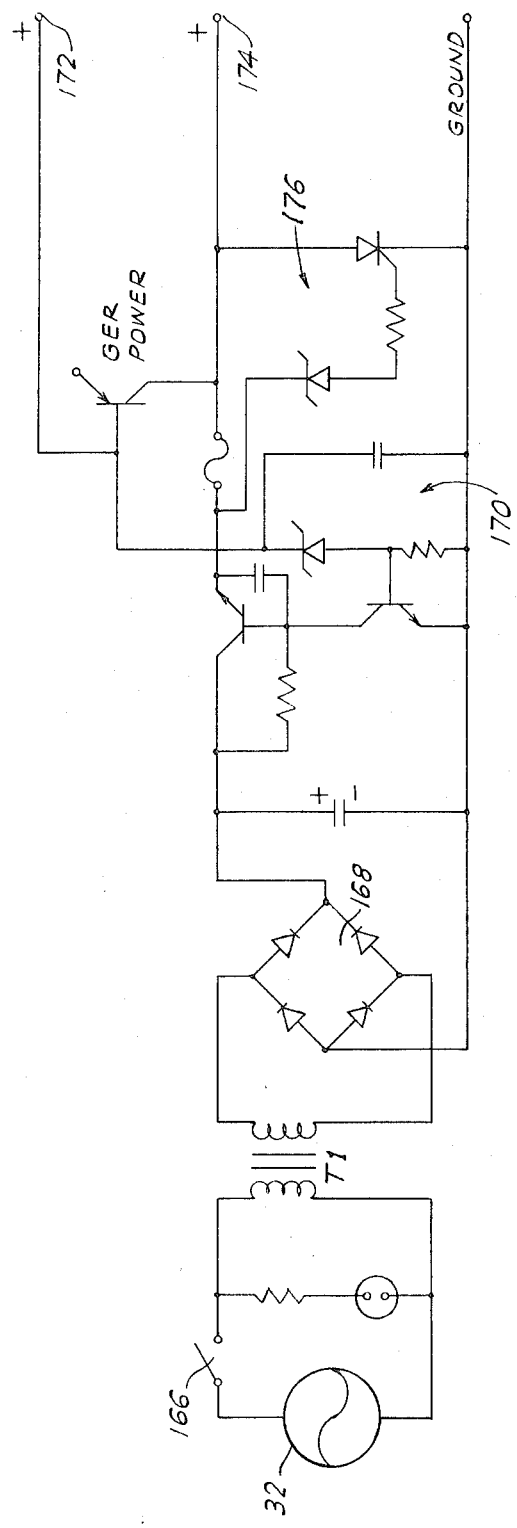
FIG. 8 is a schematic diagram depicting the requlated power supply having over voltage protection circuitry.

The gate pack 212 is substantially identical to the gate packs 214, 216, and 218, and comprises a set of four two-input AND gates 242, 244, 246 and 248 which have their outputs provided as an input to a four input NOR gate 250. The output of the NOR gate 250 is provided as one input to a two-input NOR gate 252 having its output provided directly to the decoder driver 220. The inputs of the AND gate 242 are operable connected to the ring counter 238 and the "D" output of the quantity counter 134 (FIG. 7). The inputs of the gate 244 are connected to the ring counter 238 and the "D" output of the quantity counter 136; likewise, gate 246 to the "D" output of the counter 138 and the ring counter 238 and gate 248 to the "D" output of the counter 140 of the ring counter 238. The gate pack 212 also comprises set st of substantially identical price gates 254 which are similarly connected to the "D" outputs of the price counters 102, 104, 106 and 108 (FIG. 6) or in case of the alternate price computer, to the "D" of the storage elements 188, 190, 192 and 194 (FIG. 9). Gate pack 214 comprises a set of quantity gates 256 connected to the "C" outputs of the counters 134, 136, 138 and 140 (FIG. 7) and a set of price gates 258 which are connected to the "C" outputs of the price counters 102, 104 106 and 108 (FIG. 8) or the "C" outputs of the storage elements 188, 190, 192 and 194 of the alternate computer 178. Gate pack 216 likewise has a quantity gate pack 260 and price gate pack 262 operably connected to the "B" outputs of the quantiy counters and the "B" outputs of the price computers or storage elements respectively. Gate pack 218 also comprises a set of quantity gates 264, and price gates 266 which are connected to the "A" outputs of the above mentioned counter and storage elements.

In operation, the read-out multiplexer 310 is installed in the gasoline dispensing unit (not shown) replacing a portion of the price and quantity counter/display units 26 and 20, respectively as hereinbefore set forth. The clock 88, during a delivery of the fluid and thereafter until the unit is reset, provides a continuous stream of pulses to the ring counter 238 for recirculating said ring counter. Establishing an arbitrary position of the ring counter 238 for purposes of explanation, an output pulse is provided at output "A" of the ring counter 238. This pulse simultaneously enables one gate of each set of price gates 254, 258, 262 and 266 thereby permitting the information in the price counter 108 (tens of dollars) to be transmitted through the gate packs 212, 214, 216 and 218 and into the decoder driver 220 where said four bit binary information is converted to digital form and provided to the appropriate seven-segment numitron unit for display. This binary information is decoded by turning on the appropriate transistors of the set of switching transistors QS. Simultaneously, the pulse from the output "A" of the ring counter 238 is provided to the base of the switching transistor Q3 which, in turn, triggers the switching transistor Q2 to provide power to the numitron digit 222. The current flow through the pair of numitrons 222 then flows through the diodes 240 to the switching transistors QS and to ground through the triggered transistors representing the binary information from the decoder driver 220.

Upon the next pulse from the clock 88 an output pulse is provided at the output "B" of the ring counter 238 thereby transmitting the binary information from the price counter 106 (unit dollars) through the decoder driver 220, displaying said price by means of the numitron 224 in a manner as hereinbefore set forth. The next clock pulse provides a pulse at the output "C" of the ring counter 238 which in a like manner causes the binary information in the price counter 104 (tenths of dollars) to be displayed by means of the numitron 226. Output "D" from the ring counter 238 causes the information stored in the price counter 102 (hundredths of dollars) to be displayed by means of the numitron 228. Output "E" from the ring counter 238 enables the information stored in the quantity counter 140 (tens of gallons) to be transmitted through the decoder driver and to be displayed by means of the numitron 230. A pulse from the "F" output of the ring counter 238 enables the information stored in the quantity counter 138 (unit gallons) to be displayed by means of the numitron 232. A pulse from the output "G" of the ring counter 238 enables the information stored in the quantity counter 136 (tenths of a gallon) to be displayed by means of the numitron 234, and a pulse from the output "H" of the ring counter 238 enables the information from the quantity counter 138 (hundredths of a gallon) to be displayed by means of the numitron 136. The next clock pulse then provides an output at "A" and the process repeates. By using a high speed clock (greater than 2 kiloHertz) the ring counter will circulate at a speed sufficient to eliminate flicker in the numitron display. This read-out miltiplexer 210 eliminates the need for individual decoder drivers for each digit and utilizes one decoder driver 230 to drive all display digits for both price and quantity display.

The digital display tubes described in this invention (RCA numitron type seven-segment incandescent filament tubes) are presently the most reliable and economical means of obtaining a decimal display of quantity and price. However, alternate display devices, such as seven-segment glow-discharge tubes, segen-segment light emitting diodes (LED), seven-segment fluorescent tubes, liquid crystal displays, and the like, could be used with slight modifications to the decoder driver circuits and, possibly to the power supply. For material dispensing systems other than those involved with retail gasoline sales, a different display tube may be more attractive from the standpoint of size of digital character available, color of display power supply requirements and reliability.

Whereas the present invention has been described in particualr relation to the drawings attached hereto, it should be understood that other and further modifications, apart from those shown or suggested herein, may be made within the spirit and scope of this invention.

What is claimed is:

1. In combination with a conventional material dispensing apparatus having an existing flowmeter with rotating shaft output, an electronic computer system comprising a pulse encoder means operable connected to the flowmeter for producing a pulse train having a frequency directly proportional to the output of the flowmeter, said pulse encoder means being operably connected to a programmable price computer for computing total cost of material dispensed, display means operably connected to the output of the price computer and operably connected to the output of the pulse encoder means for displaying the total cost and quantity, respectively, of the material delivered, and a power supply for supplying direct current electrical power to the system, and wherein the pulse encoder means comprises a substantially transparent optical encoder wheel the plane of which is disposed perpendicularly to the axis of the rotating shaft of the flowmeter and secured thereto, an infra red (IR) emitter disposed on one side of the encoder wheel for emitting an IR beam of light through said wheel, an IR detector disposed on the opposite side of said wheel for receiving said IR beam of light and for converting said IR beam to an electric current, a plurality of opaque strips equally spaced and radially secured near the outer edge of the encoder wheel for interrupting the IR beam of light as the wheel is rotated, pulse shaper and divider means operably connected to the output of the IR detector for converting the intermittent electrical current therefrom into an electrical square pulse train and dividing said pulse train to a number of pulses per unit measure of material dispensed which is compatible with the price computer and display means whereby as the flowmeter shaft rotates at a rate proportional to the measure of material being dispensed the opaque strips interrupt the IR beam thereby producing a pulse train having a frequency directly proportional to the rate of material being dispensed, and wherein a second plurality of opaque strips are equally spaced and radially secured to the flat surface of the encoder wheel radially inward from the first plurality of opaque strips for conversion to a second system of measurement and wherein the said IR emitter and detector are disposed within a housing, said housing being rotatably secured to the material dispensing apparatus wherein said housing may be rotated to selectively position the IR emitter and detector on either side of the first plurality of opaque strips or the second plurality of opaque strips in accordance with the desired system of measurement, and wherein the programmable price computer comprises a first set of three staged programmable decade counters a set of three binary coded decimal (BCD) encoders for programming said decade conters to the additive inverse of the desired price per unit measure of material to be dispensed, a price setting switch for each of said diode encoders, a second set of three staged decade 4-bit counters having the third stage output thereof operably connected to the display means; free running clock means for producing clock pulses, a first gate means interposed between said clock means and the first stage of the first set of decade counters and the first stage of the second set of decade counters for gating clock pulses serially into said decade counters, control flip-flop operably connected to the output of the pulse encoder means and having its output connected to the first gate means for enabling said gate upon receipt of the leading edge of a pulse from the pulse encoder means, said control flip-flop being also operably connected to each of the first set of decade counters for resetting said counters to their programmed value at the end of the pulse from the pulse encoder means, a second gate means having inputs operably connected to the first set of decade counters for disabling the first gate means when said decade counters are full whereby upon receipt of the leading edge of a pulse from the pulse encoder means the control flip-flop enables the first gate means thereby allowing clock pulses to pass serially into the second set of decade counters thereupon causing the second gate means to disable the first gate means thereby stopping the flow of clock pulses into the second set of decade counters, the second set of decade counters then containing the total cost of the material dispensed as represented by the single pulse from the pulse encoder means.

2. In combination with a conventional material dispensing apparatus having an existing flowmeter with rotating shaft output, an electronic computer system as set forth in claim 1 wherein the third stage of the second set of decade counters is preprogrammed to a BCD level of 5 to achieve a rounding off of the total cost to be displayed.

3. In combination with a conventional material dispensing apparatus having an existing flowmeter with rotating shaft output, an electronic computer system as set forth in claim 2 wherein the display means consists of a price counter display means and a substantiall identical quantity counter display means, said price counter display means comprising a set of four staged BCD decade price counters, the first stage thereof being operably connected to the output of the price computer, four price decoder drivers operably connected to the said price decade counters for decoding the information contained therein and four pairs of incandescent filament digital price display tubes for displaying the total cost of material dispensed; and said quantity counter display means comprising a set of four staged BCD quantity decade counters, the first stage being operably connected to the output of the pulse encoder means, four quantity decoder drivers operably connected to said quantity decade counters for decoding the information contained therein and four pairs of incandescent filament digital quantity display tubes for displaying the total quantity of material dispensed.

4. In combination with a conventional material dispensing apparatus having an existing flowmeter with rotating shaft output, an electronic computer system as set forth in claim 2 wherein the display means comprises four staged BCD 4-bit price decade counters the first stage being operably connected to the output of the price computer for receiving and storing the total price of material dispensed and four staged BCD 4-bit quantity decade counters, the first stage being operably connected to the output of the pulse encoder means for receiving and storing the total quantity of material dispensed; a first gate pack operably connected to the first bit output of the each of the said 4-bit price decade counters and to the first bit output of each of the 4-bit quantity decade counters; a second gate pack operably connected to the second bit output of each of the said 4-bit price decade counters and to the second bit output of each of the 4-bit quantity decade counters; a third gate pack operably connected to the third bit output of each of the said 4-bit price decade counters and to the third bit output of each of the said 4-bit quantity decade counters; a fourth gate pack operably connected to the fourth bit output of each of the said 4-bit price decade counters and to the fourth bit of each of the 4 -bit quantity decade counters, 4-bit input decoder driver the input thereof being operably connected to each of the said gate packs for decoding the 4-bit information therein; four pairs of seven-segment numitron price display units operably connected to the output of the decoder driver for displaying the total price of the material dispensed and four pairs of seven-segment numitron quantity display units for displaying the total quantity of material dispensed; an 8-bit recirculating ring counter operably connected to the clock means and to each of the gate packs and to each of the eight pairs of numitron display units for sequentially gating the information in each of the said 4-bit price and quantity decade counters to the decoder driver and for simultaneously enabling the information in each of said 4-bit counters to be digitally displayed by its asociated numitron unit, whereby upon receipt of the first clock pulse by the recirculating ring counter the information contained in the first 4-bit price decade counter is transmitted to the decoder driver where said 4-bit information is decoded and displayed by the first pair of seven-segment numiton price display units and upon the receipt of the second clock pulse the information contained in the second 4-bit price decade counter is displayed by the second numitron unit, the process being repeated for each of the eigh 4-bit price and quantity decade counters, the recirculation being of a rate sufficient to eliminate flicker in the displayed price and quantity information.

5. In combination with a conventional material dispensing apparatus having an existing flowmeter with rotating shaft output, an electronic computer system comprising a pulse encoder means operably connected to the flowmeter for producing a pulse train having a frequency directly proportional to the output of the flowmeter, said pulse encoder means being operably connected to a programmable price computer for computing total cost of material dispensed, display means operably connected to the output of the price computer and operably connected to the output of the pulse encoder means for displaying the total cost and quantity, respectively, of the material delivered, and a power supply for supplying direct current electrical power to the system, and wherein the pulse encoder means comprisex a substantially transparent optical encoder wheel the plane of which is disposed perpendicularly to the axis of the rotating shaft of the flowmeter and secured thereto, an infra red (IR) emitter disposed on one side of the encoder wheel for emitting an IR beam of light through said wheel, an IR detector disposed on the opposite side of said wheel for receiving said IR beam of light and for converting said IR beam to an electric current, a plurality of opaque strips equally spaced and radially secured near the outer edge of the encoder wheel for interrupting the IR beam of light as the wheel is rotated, pulse shaper and divider means operably connected to the output of the IR detector for converging the intermittent electrical current therefrom into an electrical square pulse train and dividing said pulse train to a number of pulses per unit measure of materal dispensed which is compatible with the price computer and display means whereby as the flowmeter shaft rotates at a rate proportional to the measure of material being dispensed the opaque strips interrupt the IR beam thereby producing a pulse train having a frequency directly proportional to the rate of material being dispensed, and wherein a second plurality of opaque strips are equally spaced and radially secured to the flat survace of the encoder wheel radially inward from the first plurality of opaque strips for conversion to a second system of measurement and wherein the said IR emitter and detector are disposed within a housing, said housing being rotatably secured to the material dispensing appartus whereby said housing may be rotated to selectively position the IR emitter and detector on either side of the first plurality of opaque strips of the second plurality of opaque strips in accordance with the desired system of measurement, and wherein the programmable price computer comprises a BCD full adder, a set of seven digitally arranged 4-bit storage elements, a first multiplexing directional gating means interposed between the output of the said storage elements and the inut of the BCD full adder for sequentially inputting the information in each of said storage elements to the adder, the last four of the seven storage element also having outputs operably connected to the display means, a set of three programmable binary price encoders for setting the price per unit measure of material to be dispensed, a second multiplexing directional gating means interposed between said price encoders and the BCD full adder for sequentially inputting the information in said decoders into the adder, a carry storage element operably connected to the adder for storing a single carry bit when the sum of the inputs to the adder exceeds the 4-bit capacity thereof, a third multiplexing directional gating mean interposed between the output of the adder and the storage elements for successively entering the 4-bit sum output from said adder into each of said storage elements, an 8-bit shift register operabley connected to the clock means and the pulse encoder means and having output connected to all of said gating means for providing gating signals to all of the multiplexing directional gating means, delayed multiplexing gating means interposed between the 8-bit shift register and the storage elements for enabling said storage elements to successively accept the input sum from the adder, the eighth bit of said shift register being operably connected to the carry storage element for resetting said carry sorage element to zero, whereby as the pulse from the pulse encoder means is shifted into the 8-bit shift register the information stored in the seven 4-bit storage elements is successively added by the BCD full adder to the price information in the price encoder along with the information in the carry storage element the sum thereof being entered into the respective storage element and whereby upon the eighth shift of the shift register the carry storage element is reset to zero, said clock being of sufficient speed to perform all eight shifts of the shift register before receipt of the next subsequent pulse from the pulse encoder means.

6. In combination ith a conventional material dispensing apparatus having an existing flowmeter with rotating shaft output, an electronic computer system as set forth in claim 5 wherein the display means consists of a price display means and a quantity display means, said price display means comprising four price decoder drivers operably connected to the last four storage elements of the price computer for decoding the information contained therein and four pairs of incandescent filament digital price display tubes for displaying the total cost of material dispensed; and said quantity counter display means comprises a set of four staged BCD quantity decade counters, the first stage being operably connected to the output of the pulse encoder means, four quantity decoder drivers operably connected to said quantity decade counters for decoding the information contained therein and four pairs of incandescent filament digital quantity display tubes for displaying the total quantity of material dispensed.

7. In combination with a conventional material dispensing apparatus having an existing flowmeter with rotating shaft output, an electronic computer system as set forth in claim 5 wherein the display means comprises four staged BCD 4-bit quantity decade counters, the first stage being operably connected to the output of the pulse encoder means for receiving and storing the total quantity of material dispensed; a first gate pack operably connected to the first bit output of each of the last four storage elements of the price computer and to the first bit output of each of the 4-bit quantity decade counters; a second gate pack operably connected to the second bit output of each of the last four storage elements of the price computer and to the second bit output of each of the 4-bit quantity decade counters; a third gate pack operably connected to the third bit output of each of the last four storage element of the price computer and to the third bit output of each of the 4-bit quantity decade counters; a fourth gate pack operably connected to the fourth bit output of each of the last four storage elements of the price computer and to the fourth bit output of each of the 4-bit quantity decade counters, a 4-bit input decoder driver, the input thereof being operably connected to each of the said gate packs for decoding the 4-bit information therein; four pairs of seven-segment numitron price display units operably connected to the output of the decoder driver for displaying the total price of the material dispensed and four pairs of seven-segment numitron quantity display units for displaying the total quantity of material dispensed; an 8-bit recirculating ring counter operably connected to the clock means and to each of the gate packs and to each of the eight pairs of numitron display units for sequentially gating the information in each of the said last four storage elements of the price computer and the 4-bit quantity decade counters to the decoder driver and for simultaneously enabling the information in each of said 4-bit counters to be digitally displayed by its associated numitron unit, whereby upon receipt of the first clock pulse by the recirculating ring counter the information contained in the first of the last four storge element of the price computer is decoded and displayed by the first pair of seven-segment nimitron price display units and upon receipt of the second clock pulse the information contained in the second of the last four storage elements of the price computer is displayed by the second numitron unit, the process being repeated for each of the said storage elements and quantity decade counters, the recirculation being of a rate sufficient to eliminate flicker in the displayed price and quantity information.

* * * * *